(12) United States Patent
Iwase

(10) Patent No.: US 12,105,457 B2
(45) Date of Patent: Oct. 1, 2024

(54) IMAGE FORMING APPARATUS

(71) Applicant: CANON KABUSHIKI KAISHA, Tokyo (JP)

(72) Inventor: Masaki Iwase, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/325,604

(22) Filed: May 30, 2023

(65) Prior Publication Data

US 2023/0393514 A1 Dec. 7, 2023

(30) Foreign Application Priority Data

Jun. 6, 2022 (JP) .................................. 2022-091723

(51) Int. Cl.
G03G 21/16 (2006.01)
G03G 15/00 (2006.01)
G03G 15/08 (2006.01)
(52) U.S. Cl.
CPC ......... *G03G 15/55* (2013.01); *G03G 15/0875* (2013.01)
(58) Field of Classification Search
CPC .............. G03G 15/55; G03G 15/0863; G03G 15/0875; G03G 21/1892; G03G 21/1896; G03G 2215/0695; G03G 2215/0697; G03G 2221/1892
See application file for complete search history.

(56) References Cited

U.S. PATENT DOCUMENTS

| | | | |
|---|---|---|---|
| 2013/0084085 A1* | 4/2013 | Tani | G03G 15/0189 399/13 |
| 2014/0301744 A1* | 10/2014 | Tenjiku | G03G 21/1623 399/13 |
| 2022/0276585 A1* | 9/2022 | Iwase | G03G 15/0875 |

FOREIGN PATENT DOCUMENTS

| | | | | |
|---|---|---|---|---|
| JP | 2004205660 A | * | 7/2004 | ......... G03G 15/0855 |
| JP | 2004-294662 A | | 10/2004 | |

* cited by examiner

*Primary Examiner* — Thomas S Giampaolo, II
(74) *Attorney, Agent, or Firm* — VENABLE LLP

(57) ABSTRACT

A regulation member allows a unit to be moved from a second position to a first position when the unit is located at a predetermined position or when the unit is not attached to an apparatus main body, and does not allow the unit to be moved from the second position to the first position when the unit is located at a position that is different from the predetermined position. A control portion indicates first information when a memory reading portion is not able to communicate with a memory of the unit and a detection portion has detected that the regulation member is located at the first position, and indicates second information when the memory reading portion is not able to communicate with the memory of the unit and the detection portion has detected that the regulation member is located at the second position.

7 Claims, 19 Drawing Sheets

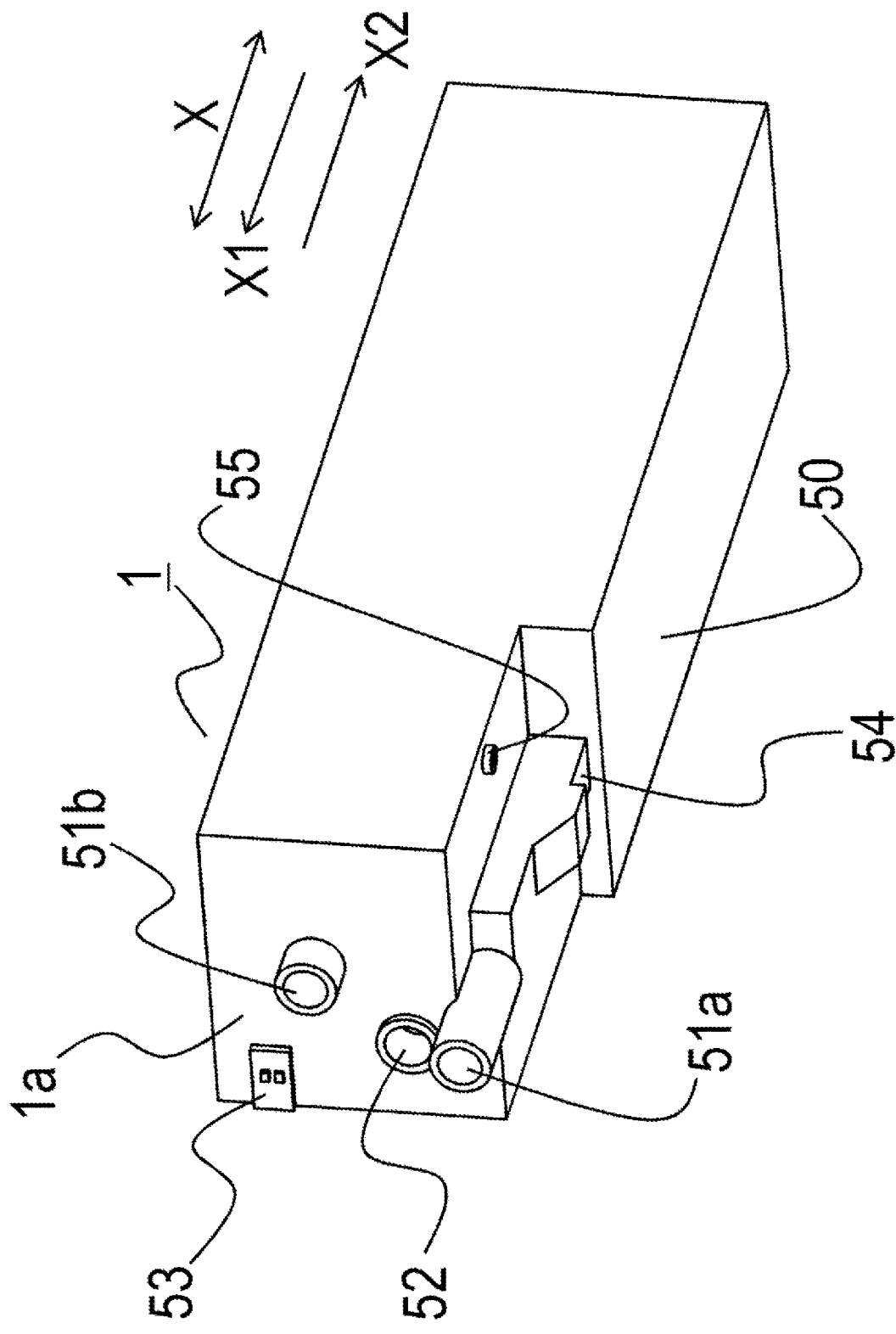

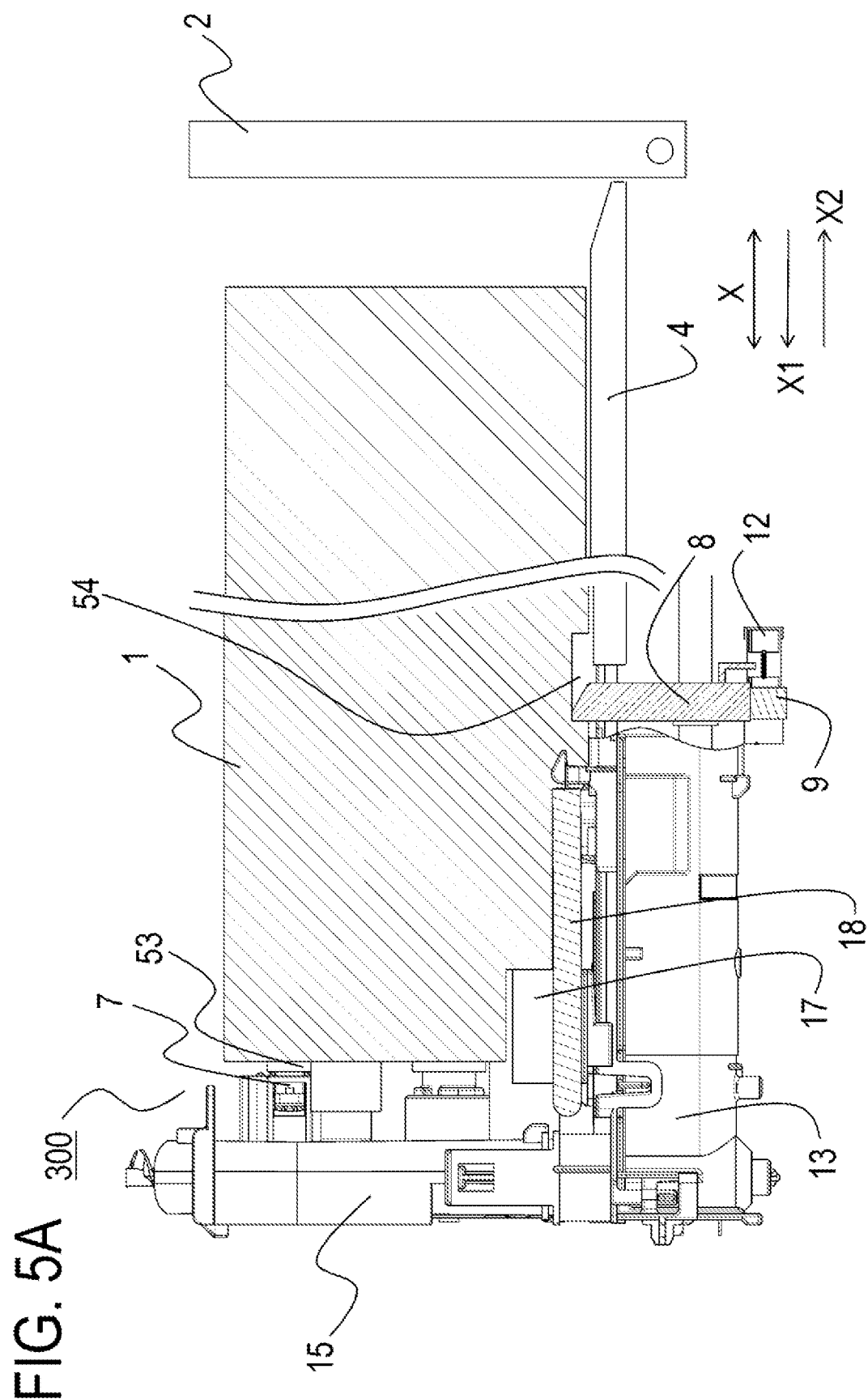

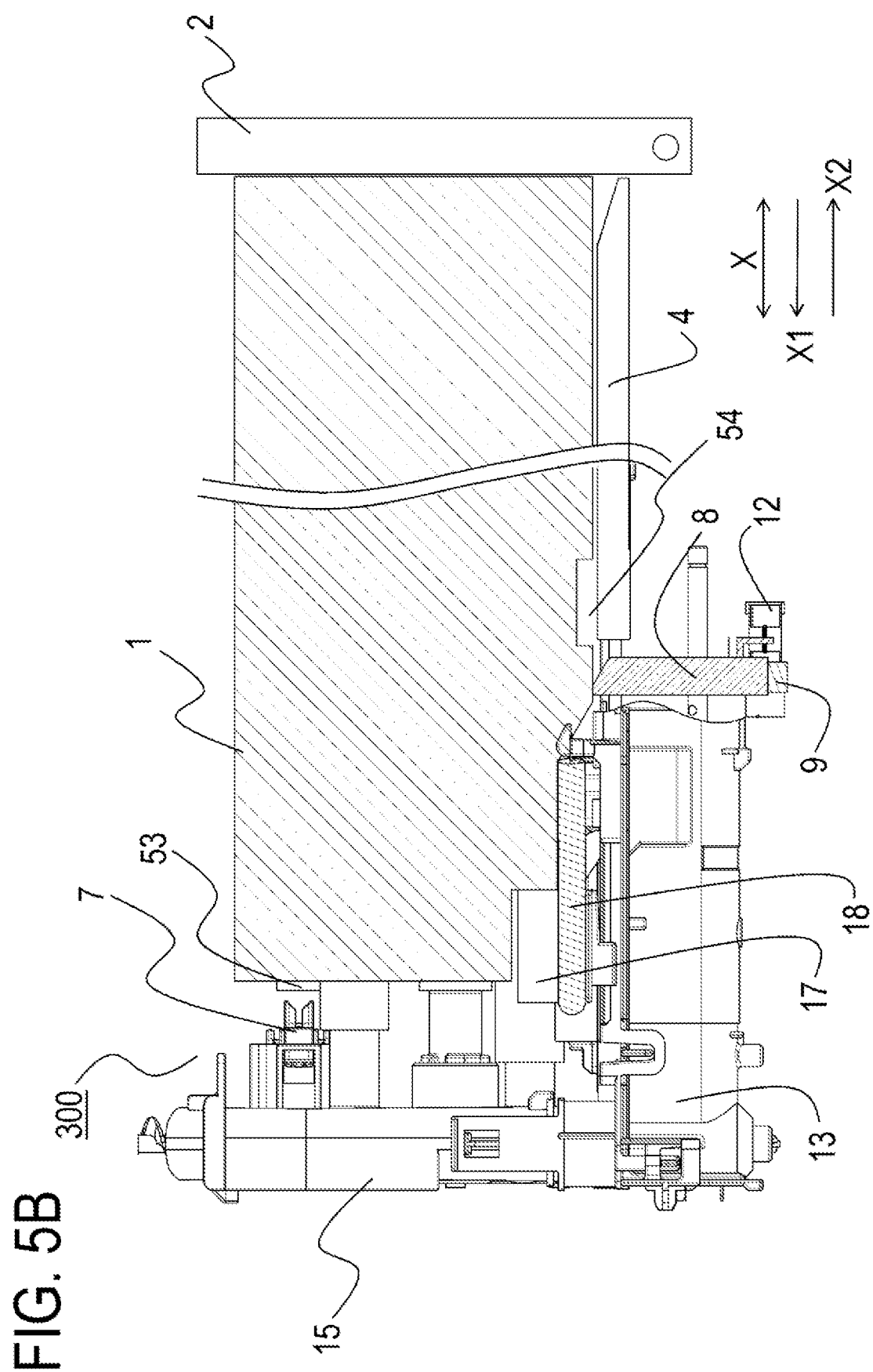

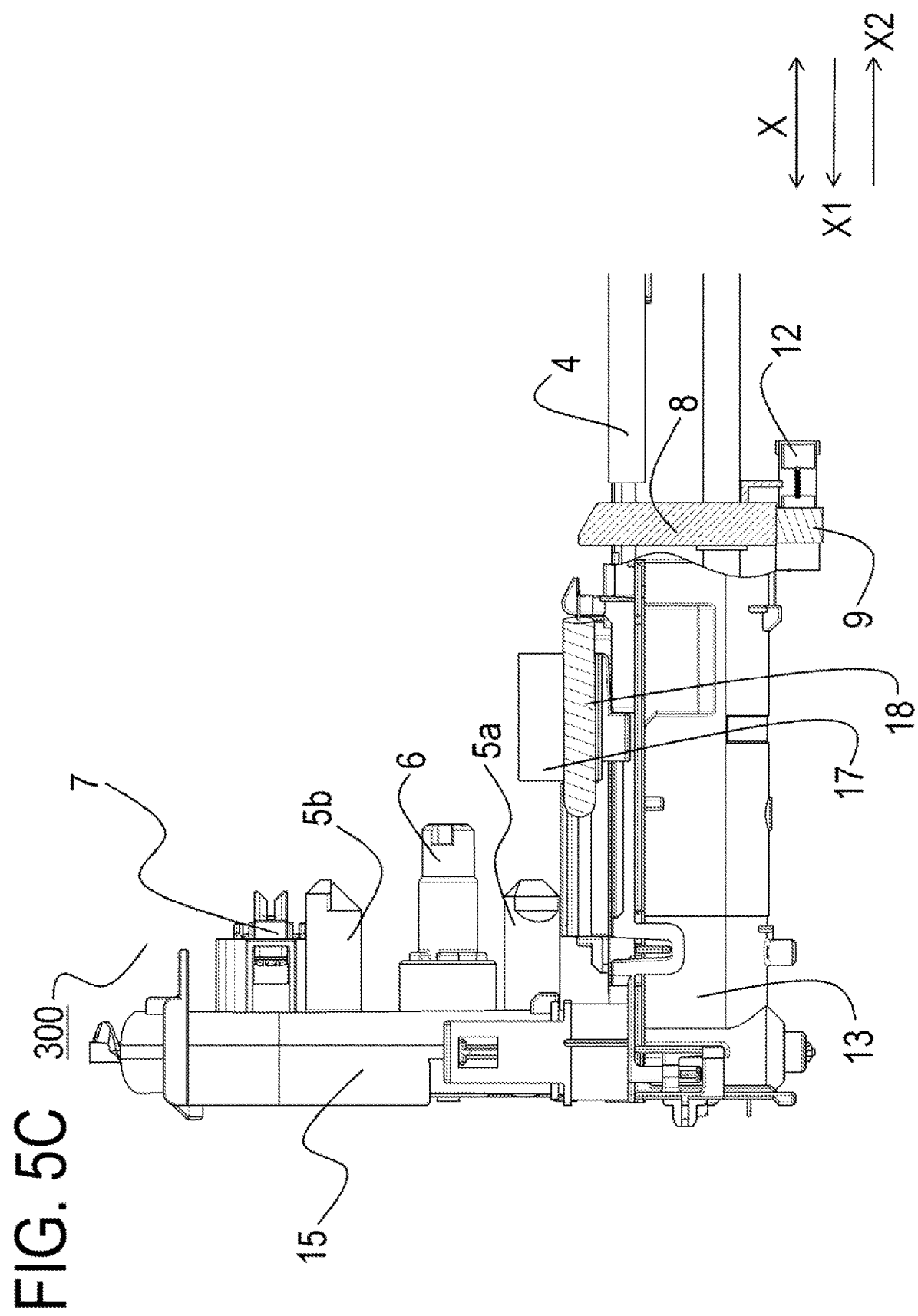

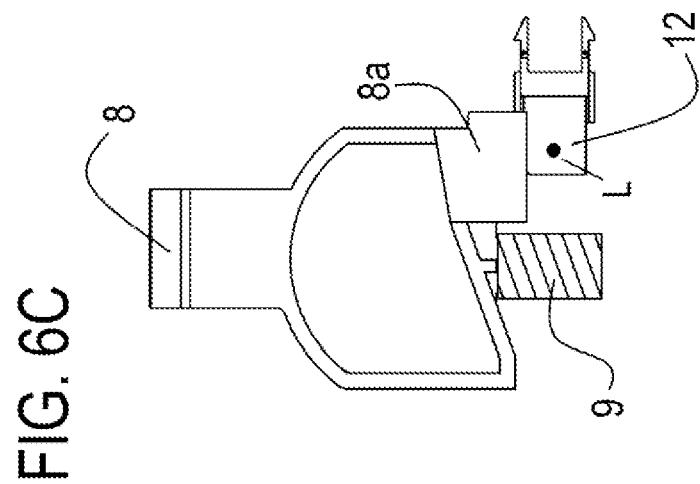
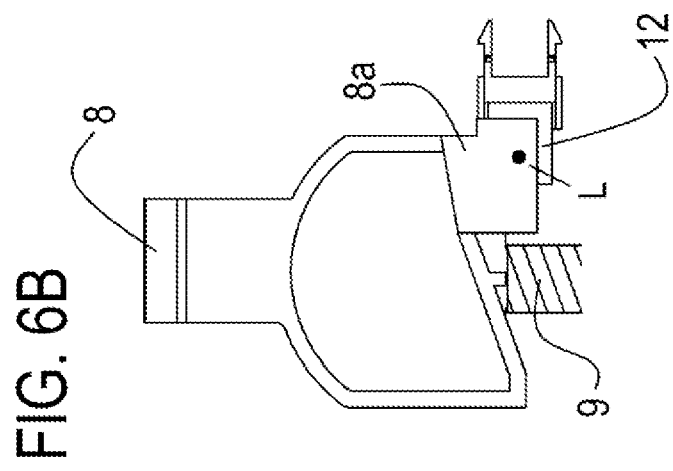
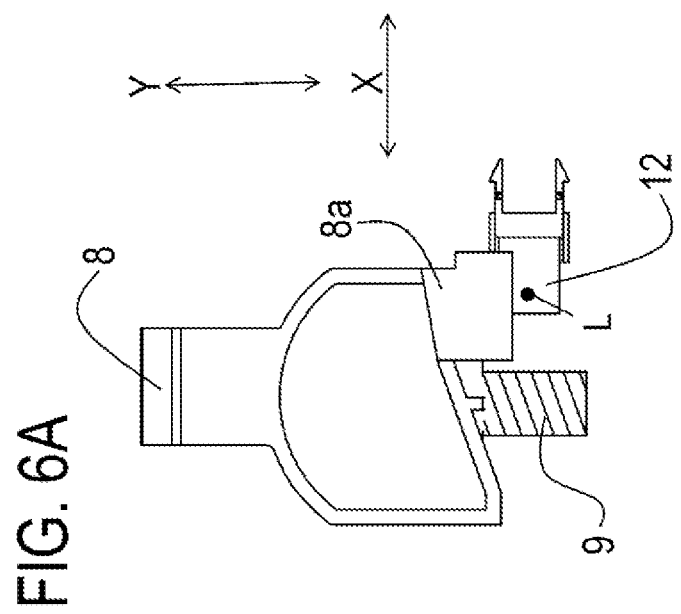

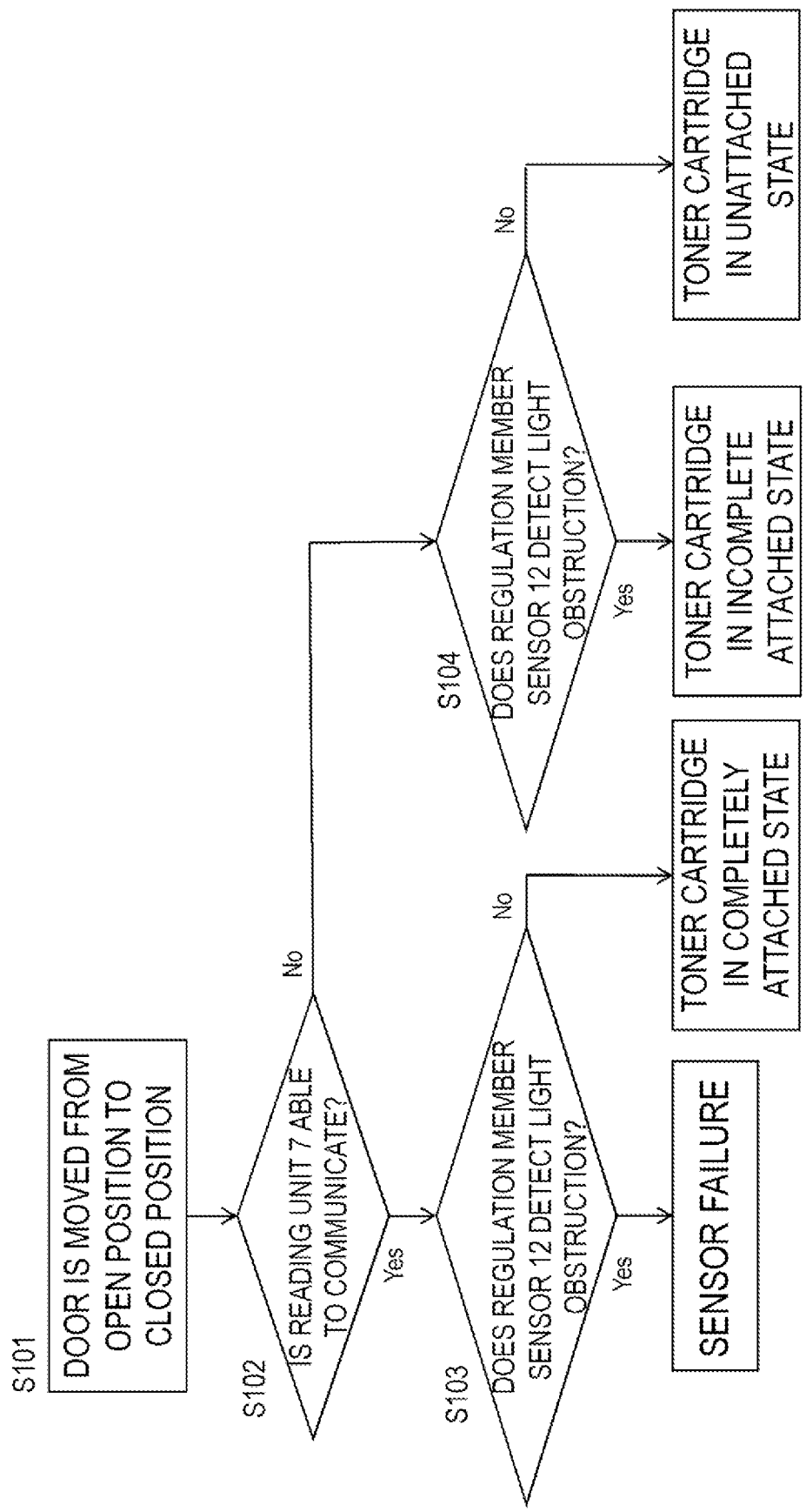

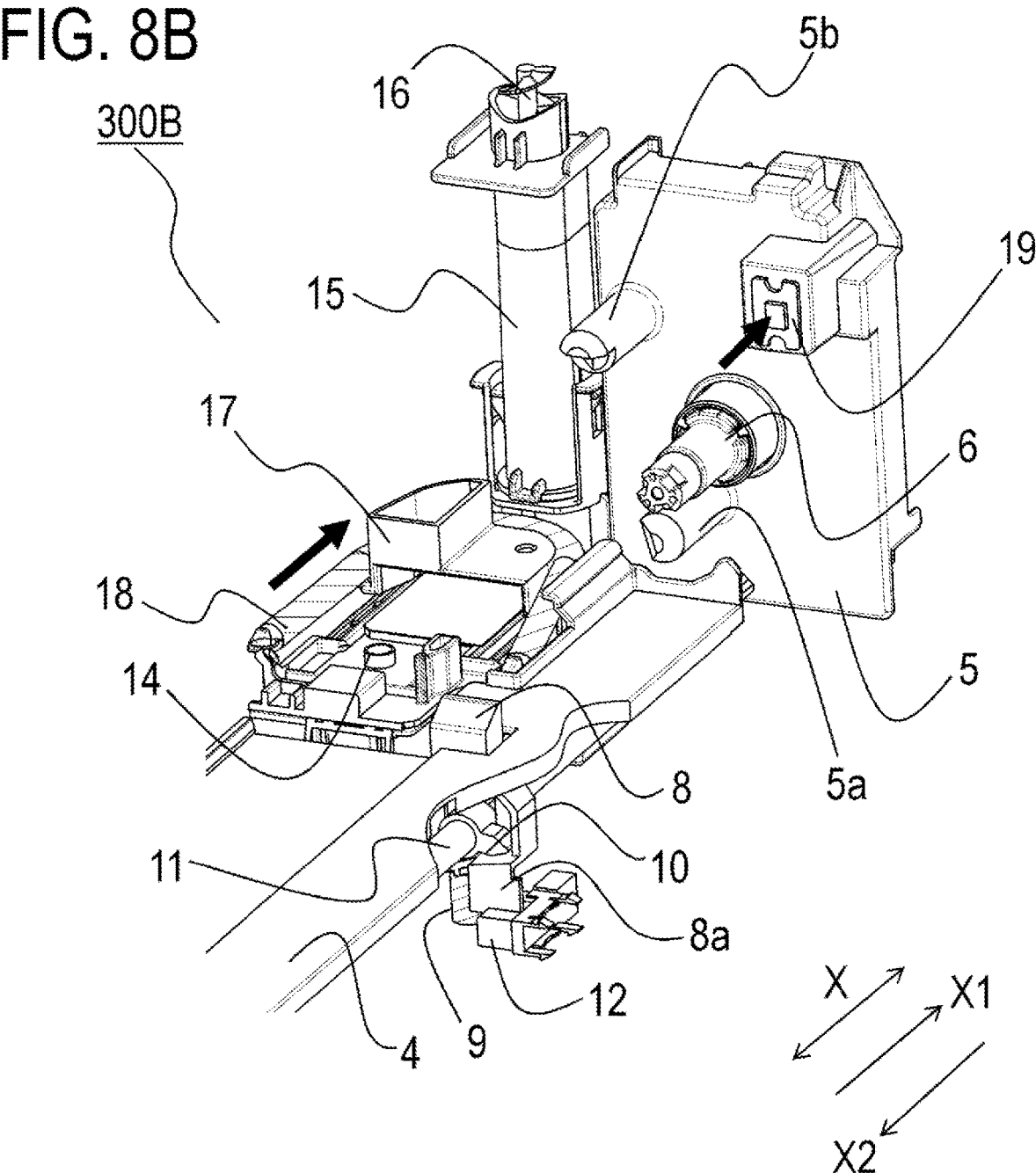

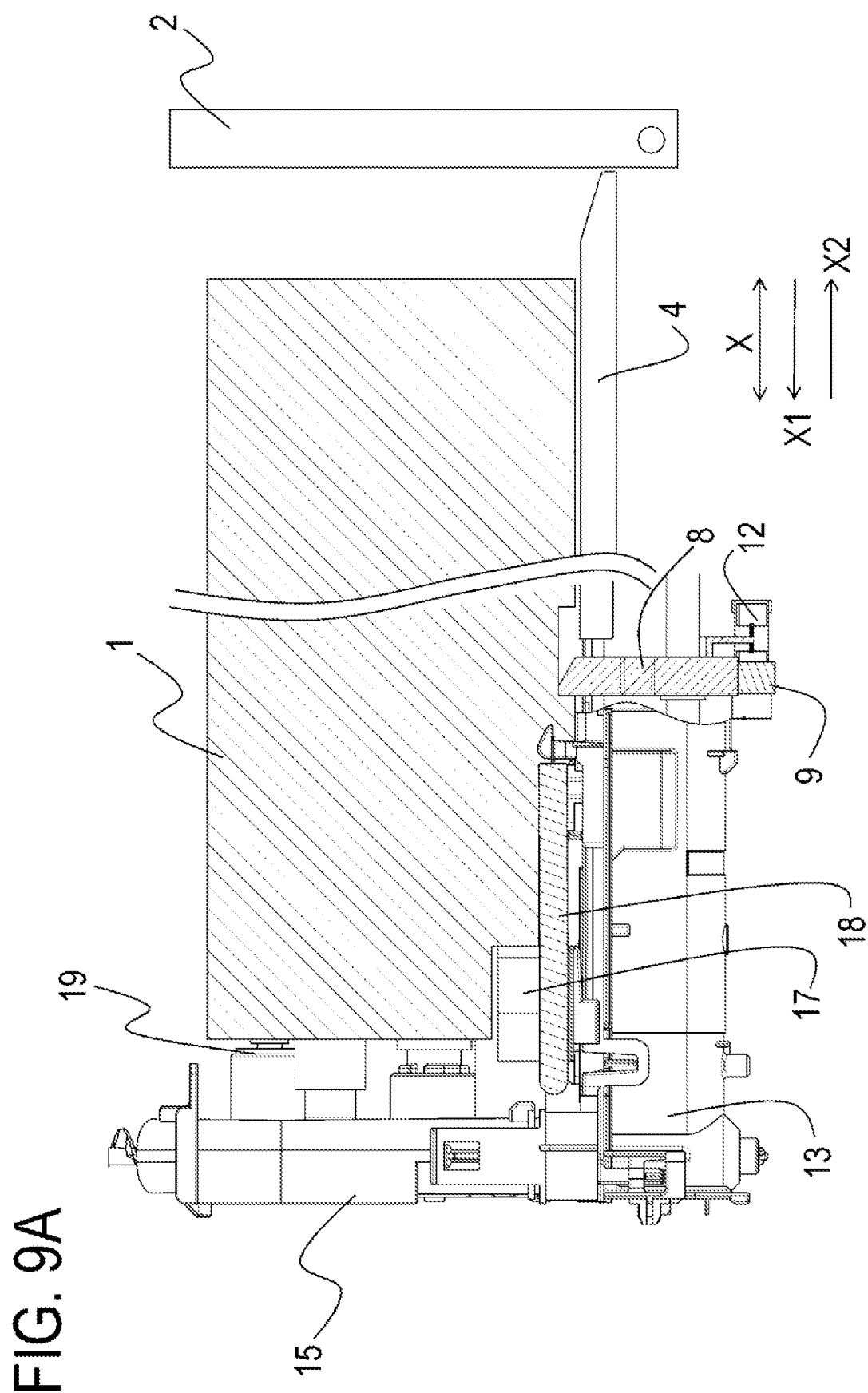

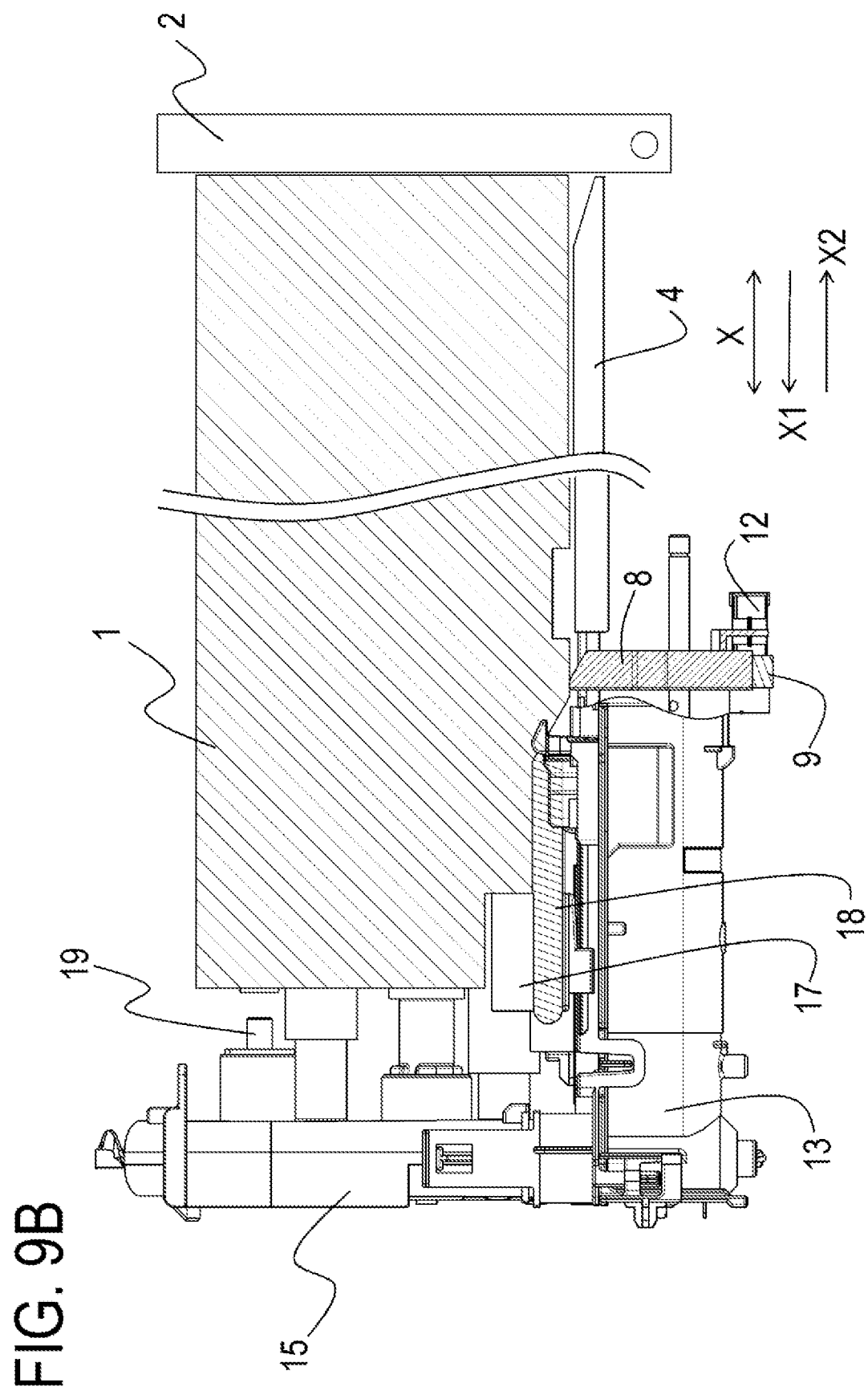

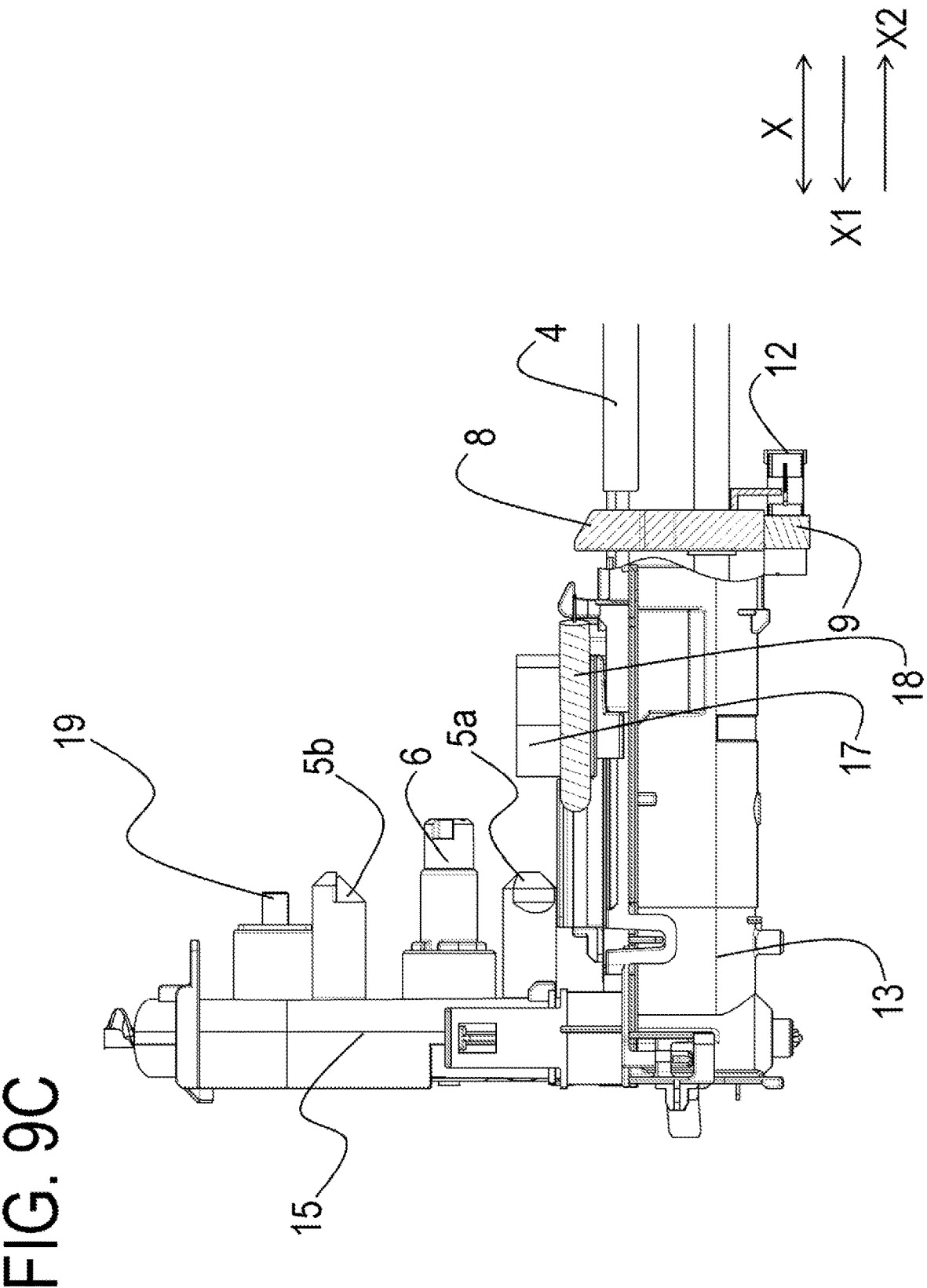

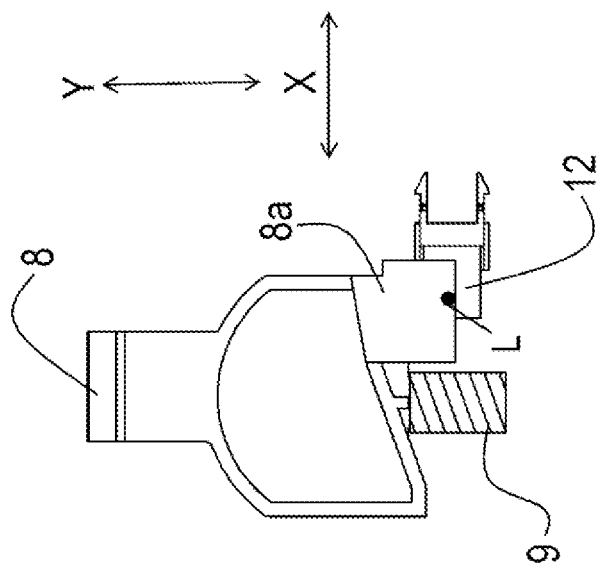

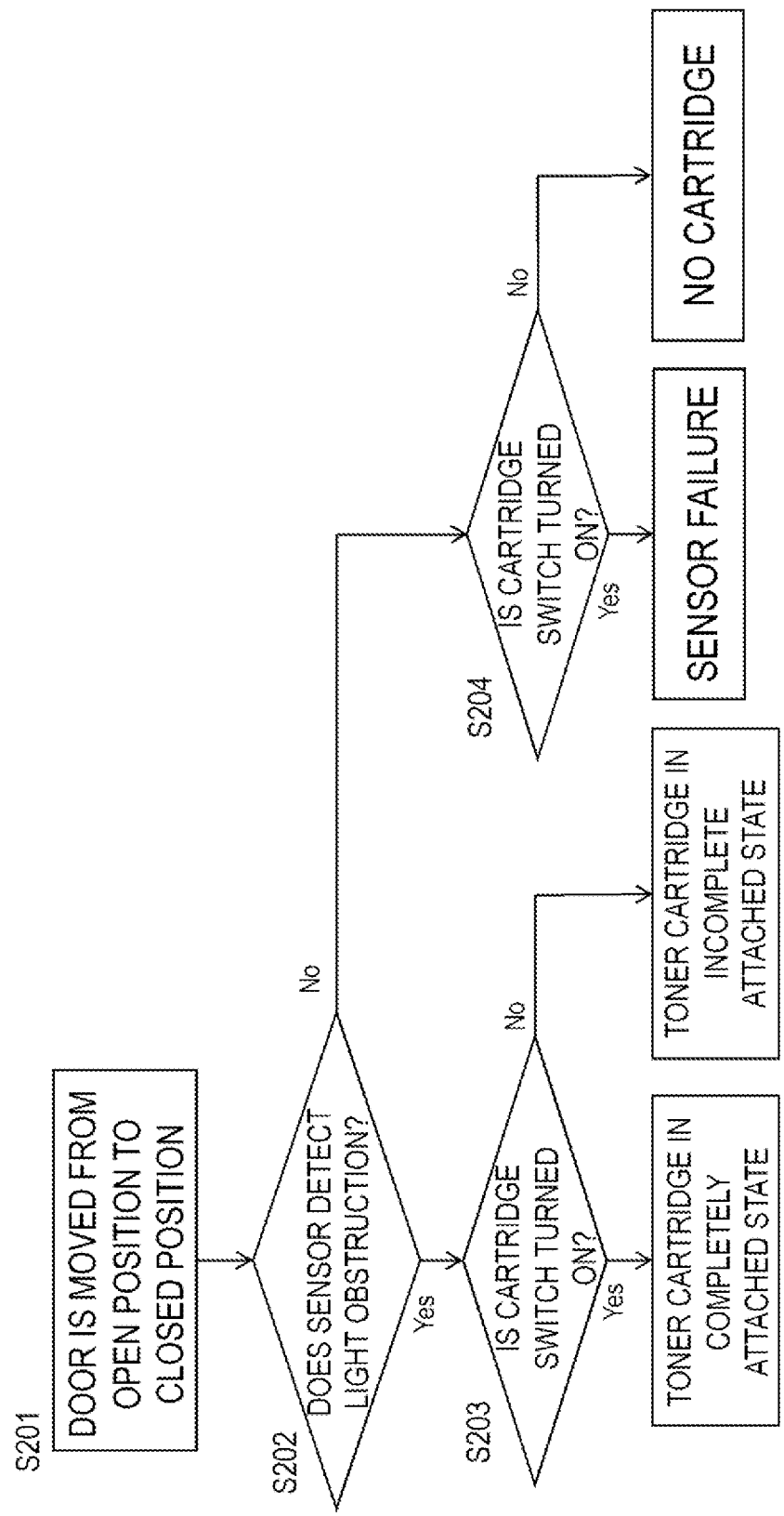

IMAGE FORMING APPARATUS

BACKGROUND OF THE INVENTION

Field of the Invention

The present invention relates to an image forming apparatus that forms an image on a recording material.

Description of the Related Art

In image forming apparatuses such as printers and copiers, it is necessary to replace consumables such as a process cartridge and a toner cartridge with a new one or one whose life has not expired when the life of the consumables has expired. Therefore, the consumables are constituted as a replaceable unit (cartridge) that can be attached to and detached from an apparatus main body of the image forming apparatus, in order to allow a user to easily replace the consumables. It is necessary to check whether or not the consumables are attached at a correct position in the apparatus main body when the consumables have been replaced, in order to prevent erroneous operation.

Japanese Patent Application Publication No. 2004-294662 discloses, as a constitution that determines whether or not a process cartridge is attached at a correct position in an apparatus main body, a constitution that determines the attached state of a process cartridge on the basis of a combination of information as to whether or not communication can be made between a memory provided in the process cartridge and a memory reading portion provided in the apparatus main body and information as to whether or not a current is flowing through a transfer roller in order to develop a toner on a photosensitive drum.

SUMMARY OF THE INVENTION

An object of the present invention is to provide an aspect of an image forming apparatus that can determine the attached state of a replaceable unit.

In order to achieve the above object, the present invention provides an image forming apparatus comprising:
an apparatus main body; and
a unit detachably attachable to the apparatus main body in a attaching/detaching direction and including an engaged portion and a memory,
wherein the apparatus main body includes
 a memory reading portion capable of reading information through communication with the memory in a case where the unit is located at a predetermined position in the apparatus main body,
 a regulation member configured to be movable between a first position and a second position, the regulation member regulating movement of the unit in a detaching direction from the predetermined position by engaging with the engaged portion of the unit in a case where the regulation member is located at the first position, and allowing movement of the unit in the detaching direction from the predetermined position in a case where the regulation member is located at the second position,
 a biasing member that biases the regulation member in a direction of moving the regulation member from the second position toward the first position,
 a detection portion that detects which of the first position and the second position the regulation member is located at,
 a control portion, and
 an informing portion;
wherein the regulation member is configured
to allow the unit to be moved from the second position to the first position by a biasing force of the biasing member in a case where the unit is located at the predetermined position or in a case where the unit is not attached to the apparatus main body, and
not to allow the unit to be moved from the second position to the first position by the biasing force in a case where the unit is located at a position that is different from the predetermined position in the attaching/detaching direction; and
wherein the control portion is configured to
cause the informing portion to indicate first information in a case where the memory reading portion is not able to communicate with the memory of the unit and the detection portion has detected that the regulation member is located at the first position, and
cause the informing portion to indicate second information that is different from the first information in a case where the memory reading portion is not able to communicate with the memory of the unit and the detection portion has detected that the regulation member is located at the second position.

In order to achieve the above object, the present invention provides an image forming apparatus comprising:
an apparatus main body; and
a unit detachably attachable to the apparatus main body in a attaching/detaching direction and including an engaged portion,
wherein the apparatus main body includes
 a first detection portion capable of detecting whether or not the unit is located at a predetermined position in the apparatus main body,
 a regulation member configured to be movable between a first position and a second position, the regulation member regulating movement of the unit in a detaching direction from the predetermined position by engaging with the engaged portion of the unit in a case where the regulation member is located at the first position, and allowing movement of the unit in the detaching direction from the predetermined position in a case where the regulation member is located at the second position,
 a biasing member that biases the regulation member in a direction of moving the regulation member from the second position toward the first position,
 a second detection portion that detects which of the first position and the second position the regulation member is located at,
 a control portion, and
 an informing portion;
wherein the regulation member is configured
to allow the unit to be moved from the second position to the first position by a biasing force of the biasing member in a case where the unit is located at the predetermined position or in a case where the unit is not attached to the apparatus main body, and
not to allow the unit to be moved from the second position to the first position by the biasing force in a case where the unit is located at a position that is different from the predetermined position in the attaching/detaching direction; and
wherein the control portion is configured to
cause the informing portion to indicate first information in a case where the first detection portion has detected that the unit is not located at the predetermined position and the second detection portion has detected that the regulation member is located at the first position, and cause the informing portion to indicate second information that is different from the first information in a case where the first detection portion has detected that the unit is not located at the predetermined position and the second detection portion has detected that the regulation member is located at the second position.

With the present invention, it is possible to provide an aspect of an image forming apparatus that can determine the attached state of a replaceable unit.

Further features of the present invention will become apparent from the following description of exemplary embodiments with reference to the attached drawings.

BRIEF DESCRIPTION OF THE DRAWINGS

FIG. 4 is a perspective view illustrating the details of a toner cartridge according to the first embodiment;

FIG. 5A is a sectional view illustrating the details of a toner cartridge attached state detection mechanism according to the first embodiment;

FIG. 5B is a sectional view illustrating the details of the toner cartridge attached state detection mechanism according to the first embodiment;

FIG. 5C is a sectional view illustrating the details of the toner cartridge attached state detection mechanism according to the first embodiment;

FIGS. 6A to 6C are each a sectional view illustrating the details of a locking mechanism position detection mechanism according to the first embodiment;

FIG. 7 is a flowchart illustrating a method of determining the attach state of the toner cartridge according to the first embodiment;

FIG. 8B is a perspective view illustrating an overview of the toner cartridge accommodation portion in the image forming apparatus according to the second embodiment;

FIG. 9A is a sectional view illustrating the details of a toner cartridge attached state detection mechanism according to the second embodiment;

FIG. 9B is a sectional view illustrating the details of the toner cartridge attached state detection mechanism according to the second embodiment;

FIG. 9C is a sectional view illustrating the details of the toner cartridge attached state detection mechanism according to the second embodiment;

FIGS. 10A to 10C are each a sectional view illustrating the details of a locking mechanism position detection mechanism according to the second embodiment;

FIG. 11 is a flowchart illustrating a method of determining the attached state of a toner cartridge according to the second embodiment;

DESCRIPTION OF THE EMBODIMENTS

Figure 1:
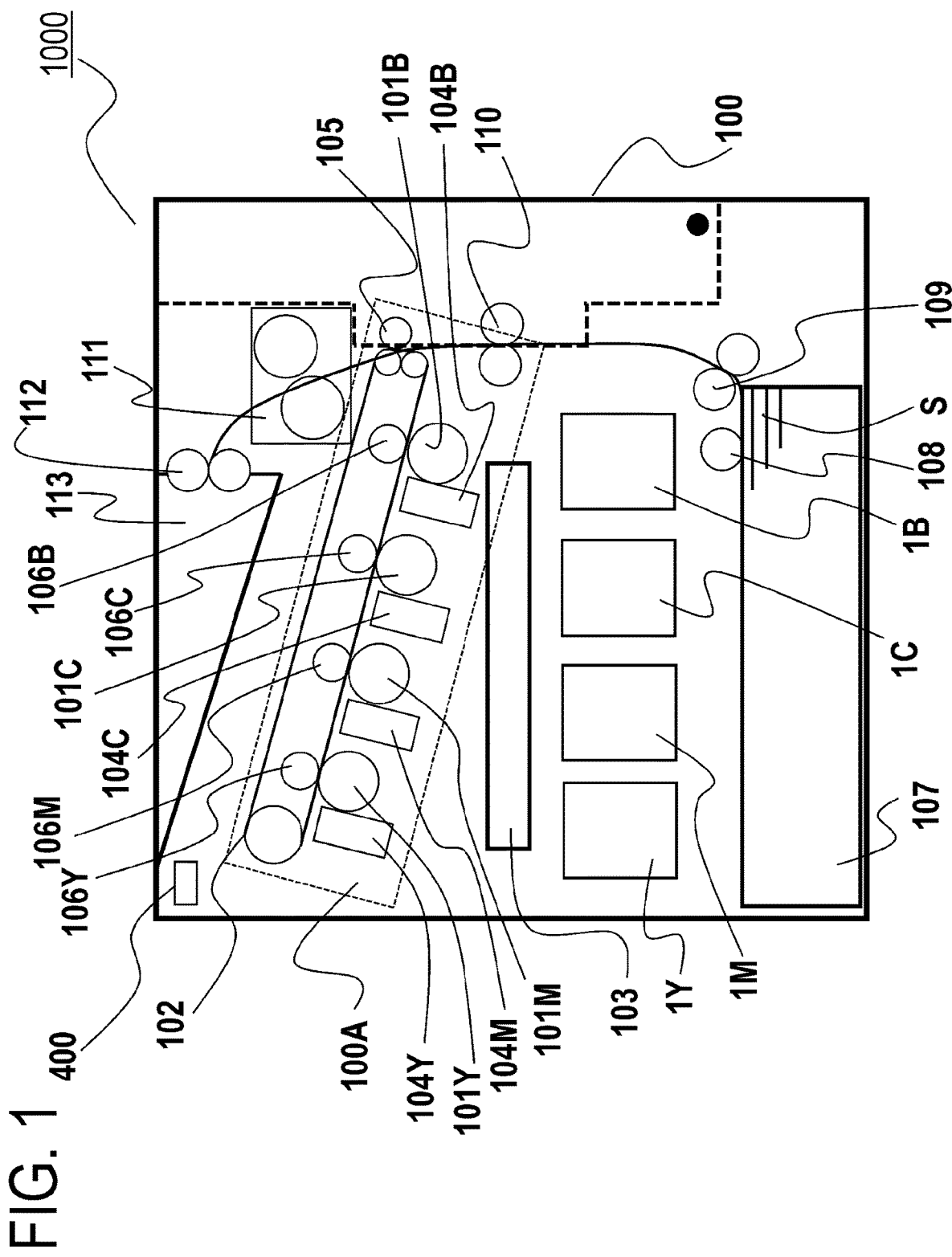
FIG. 1 is a sectional view illustrating an image forming apparatus according to a first embodiment.

Referring to the drawings, forms for carrying out the present invention will be described in detail by way of example on the basis of an embodiment example. Note that dimensions, materials, shapes, relative positioning, and the like of components described in each of embodiments are to be appropriately changed in accordance with configurations of an apparatus and a device to which the invention is applied and various conditions, and are therefore not intended to limit the scope of the invention to the following embodiments.

First Embodiment

An image forming apparatus according to a first embodiment of the present invention will be described below. FIG. 1 is a schematic view illustrating a color laser printer 1000 as an example of an image forming apparatus. The color laser printer 1000 includes an apparatus main body 100 and toner cartridges 1Y, 1M, 1C, and 1B (replaceable units, cartridges, consumables) that can be attached to and detached from the apparatus main body 100. Reference sign 100A denotes an image forming portion provided in the apparatus main body 100 to form an image through an electrophotographic system. The image forming portion 100A includes photosensitive drums 101Y, 101M, 101C, and 101B (hereinafter referred to as "photosensitive drums 101") for forming toner images in four colors including yellow (Y), magenta (M), cyan (C), and black (B). The image forming portion 100A further includes an endless intermediate transfer belt 102 that contacts the photosensitive drums 101, primary transfer rollers 106Y, 106M, 106C, and 106B that contact the inner peripheral surface of the intermediate transfer belt 102, and a secondary transfer roller 105 that contacts the outer peripheral surface of the intermediate transfer belt 102.

An image forming process performed by the image forming portion 100A will be described. An electrostatic latent image is formed on the surface of each of the photosensitive drums 101 when a laser scanner 103 irradiates the photosensitive drums 101 with light that matches an image signal. Next, a toner image (visible image) is formed on each of the photosensitive drums 101 when the electrostatic latent image is developed using toners accommodated in first toner accommodation portions 104Y, 104M, 104C, and 104B. The toner image formed on each of the photosensitive drums 101 is then transferred to the intermediate transfer belt 102 through a primary transfer, and the toner image on the intermediate transfer belt 102 is moved toward a secondary transfer portion. When the toners in the first toner accommodation portions 104Y, 104M, 104C, and 104B are consumed, the first toner accommodation portions 104Y, 104M, 104C, and 104B are replenished with toners consecutively fed from the toner cartridges 1Y, 1M, 1C, and 1B.

Sheets S as recording materials are fed, one sheet at a time, from a sheet accommodation unit 107 by a pick-up roller 108 concurrently with the image forming process performed in the image forming portion 100A described above. The sheet S is conveyed to a secondary transfer portion formed by the intermediate transfer belt 102 and a nip of the secondary transfer roller 105 by a feed roller 109 and a resist roller 110 that corrects skew of the sheet S. It is necessary to align the sheet S with respect to the toner image formed on the intermediate transfer belt 102 in the position in the sheet conveyance direction of the sheet S, and therefore the timing of the sheet S is adjusted by controlling the conveyance speeds of the resist roller 110 and the feed roller 109. Then, the toner image is transferred from the intermediate transfer belt 102 to the sheet S by applying a current at a high voltage to the secondary transfer roller 105 at the secondary transfer portion. After that, the sheet S to which the toner image has been transferred is conveyed to a fixing unit 111, and the toner image is heated and pressurized at the fixing unit 111 to be fixed to the sheet S. After the fixation, the sheet S is discharged by a discharge roller 112 to a discharge portion 113 at the upper portion of the apparatus.

Figure 2:
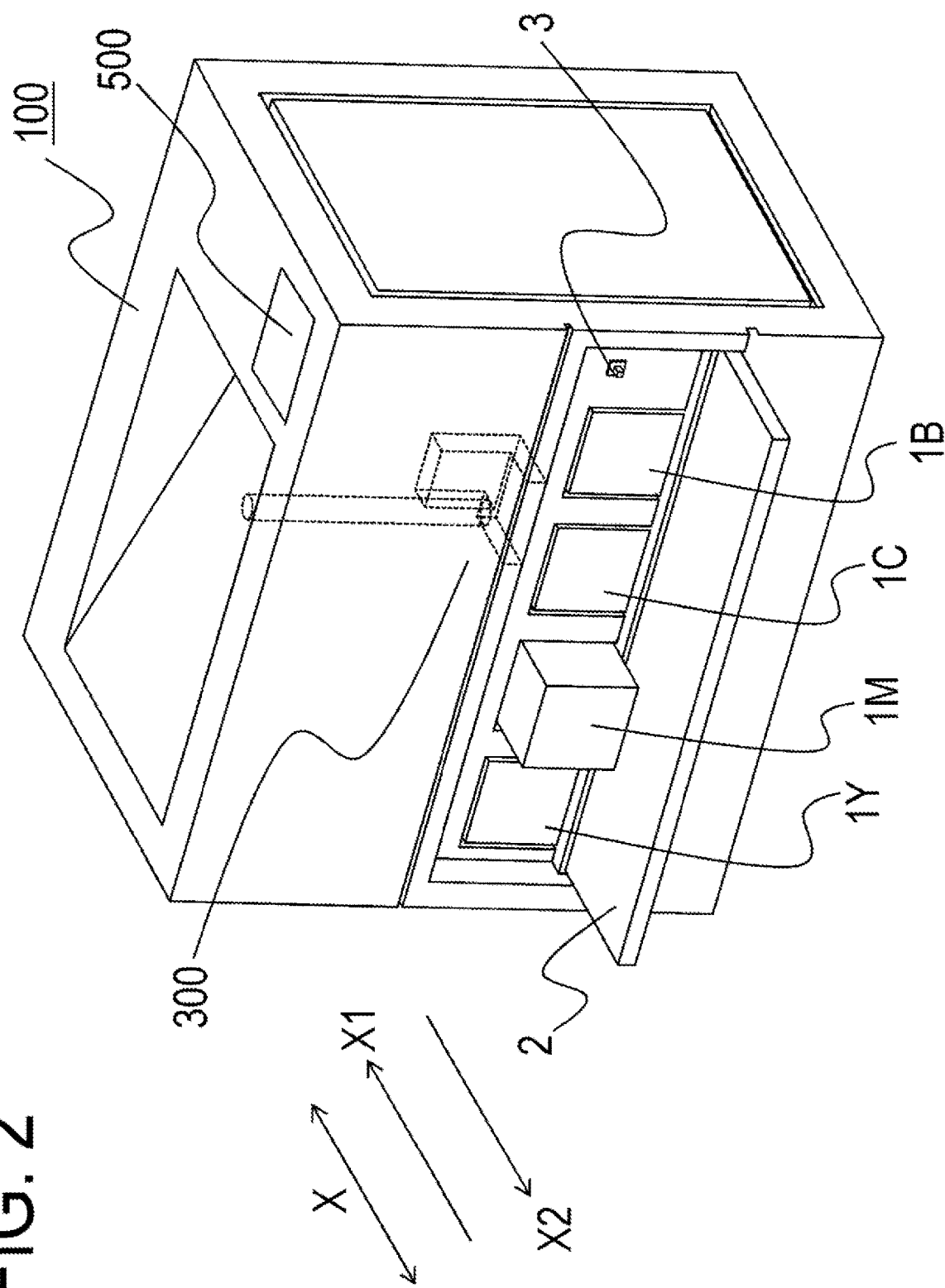
FIG. 2 is a perspective view illustrating a cartridge replacement door of the image forming apparatus according to the first embodiment.

FIG. 2 illustrates a state in which a door 2 of the apparatus main body 100 has been opened to replace the toner cartridges 1. The door 2 is configured to open and close an opening portion through which the toner cartridges 1 pass to be attached to and detached from a attachment portion 300 in the apparatus main body 100. Four toner cartridges 1 are arranged in the order of yellow 1Y, magenta 1M, cyan 1C, and black 1B from the left side, and are each attached to the attachment portion 300 in the apparatus main body 100. FIG. 2 illustrates a state in which the toner cartridge 1M is being replaced. The apparatus main body 100 includes a door detection sensor 3 that detects whether the door 2 is open or closed. The door detection sensor 3 outputs different signals between when the door 2 is open and when the door 2 is closed.

Figure 3A:
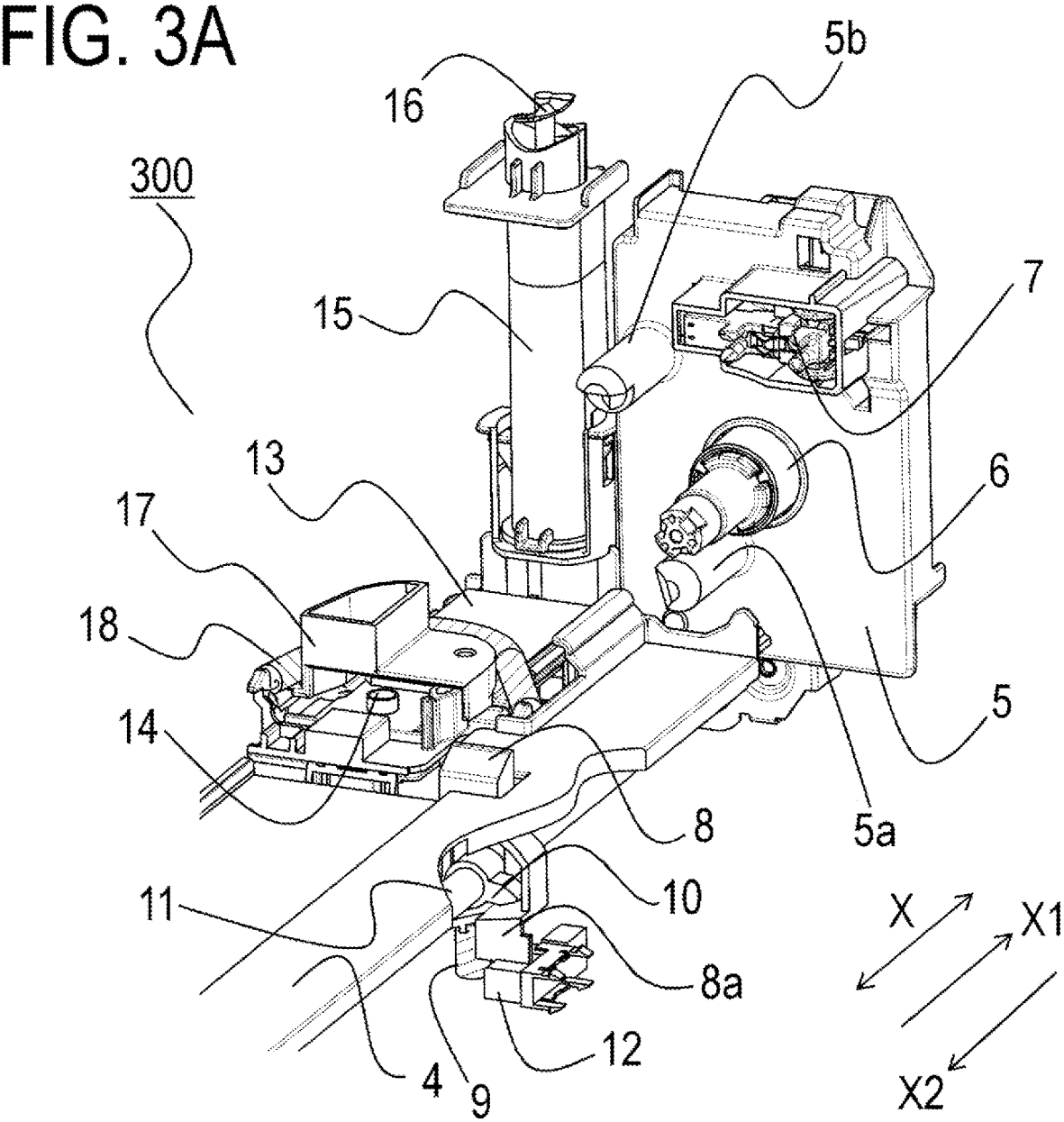
FIG. 3A is a perspective view illustrating an overview of a toner cartridge accommodation portion in the image forming apparatus according to the first exemplary embodiment.
Figure 3B:
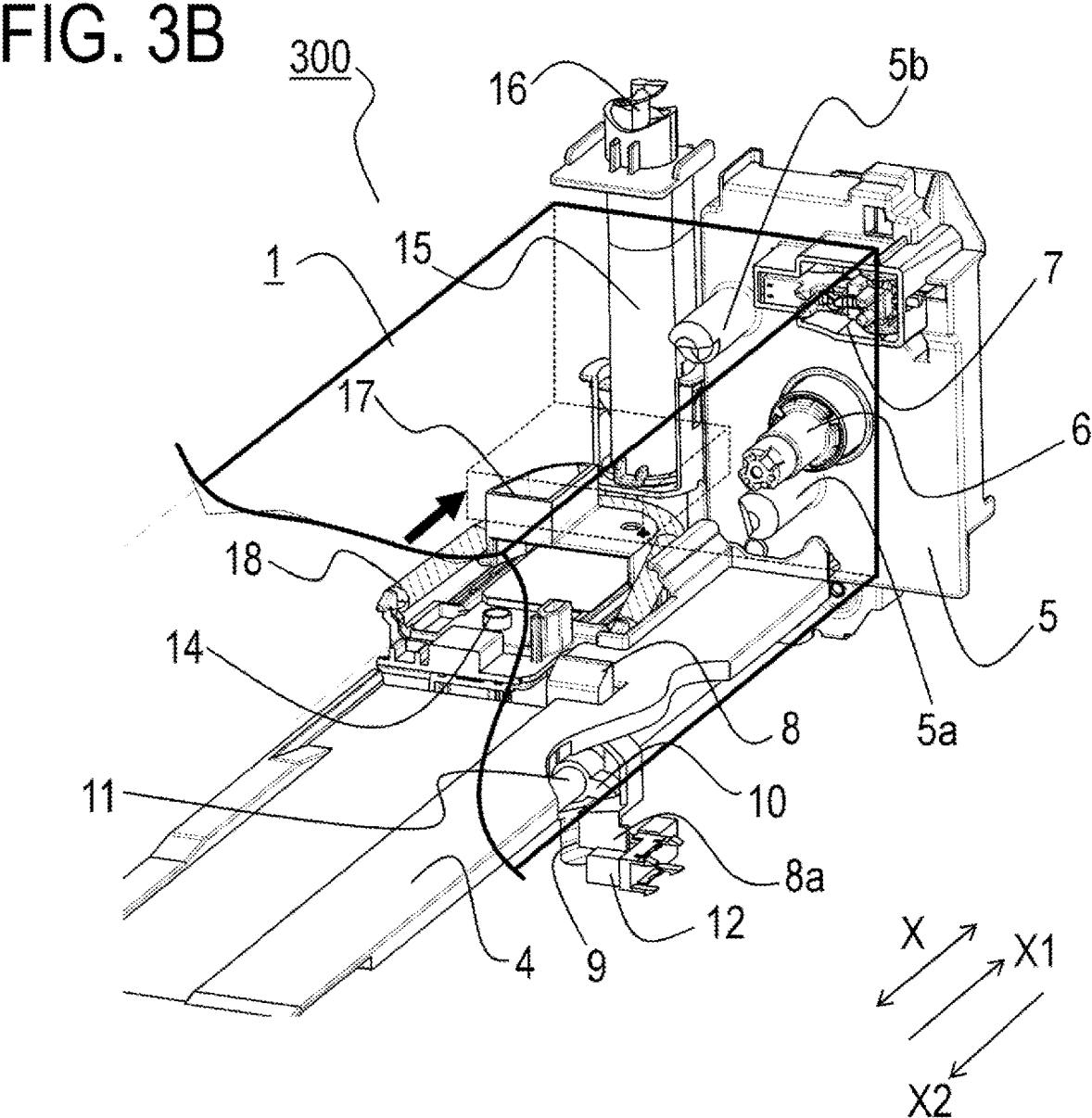
FIG. 3B is a perspective view illustrating an overview of the toner cartridge accommodation portion in the image forming apparatus according to the first exemplary embodiment.

FIGS. 3A and 3B are each a perspective view of the attachment portion 300 for attaching the toner cartridge 1. The attachment portion 300 is located at the back surface portion of the toner cartridge 1 that has been attached, and indicated by the broken line in FIG. 2. FIG. 3A is a perspective view of the attachment portion 300 in an unattached state in which the toner cartridge 1 is not attached to the apparatus main body 100. FIG. 3B is a perspective view of the attachment portion 300 in a attached state in which the toner cartridge 1 is attached to the apparatus main body 100. FIG. 4 is a perspective view illustrating the details of a back surface and a bottom surface of the toner cartridge 1.

A cartridge guide 4 illustrated in FIGS. 3A and 3B guides the toner cartridge 1 when the toner cartridge 1 is moved in a attaching direction X1 with respect to the apparatus main body 100 to be attached to the attachment portion 300 and when the toner cartridge 1 is moved in a detaching direction X2 to be detached from the attachment portion 300. The cartridge guide 4 is configured to guide a second toner accommodation portion 50 (see FIG. 4) of the toner cartridge 1 that accommodates the toner. The detaching direction X2 is opposite to the attaching direction X1. The attaching direction X1 and the detaching direction X2 are collectively referred to as a "attaching/detaching direction X".

Positioning shafts 5a and 5b provided on a cartridge positioner 5 illustrated in FIGS. 3A and 3B are fitted with positioning holes 51a and 51b, respectively, provided in a back surface 1a (an end surface on the downstream side in the attaching direction X1, an end surface on the upstream side in the detaching direction X2) of the toner cartridge 1 in FIG. 4. Consequently, the toner cartridge 1 is positioned with respect to the apparatus main body 100 in directions that are orthogonal to the attaching/detaching direction X. One of the positioning holes 51a and 51b is a round hole, while the other is an elongated hole.

A cartridge driving coupling shaft 6 illustrated in FIGS. 3A and 3B is a drive transfer unit to be engaged with a coupling 52 provided on the back surface 1a of the toner cartridge 1 in FIG. 4 to drive a member (not illustrated) that stirs the toner in the toner cartridge 1 and a toner conveyance screw (not illustrated). A memory reading unit 7 (body memory contact portion, memory reading portion) is a reading unit that electrically communicates by contacting a memory 53 (cartridge memory contact portion) provided on the back surface 1a of the toner cartridge 1 to read information stored in the memory 53 such as the remaining amount of the toner.

A regulation member 8 (engaging member) illustrated in FIGS. 3A and 3B is biased toward the toner cartridge 1 (second toner accommodation portion 50) by a regulation spring 9 (biasing member, elastic member). In addition, the regulation member 8 is configured to be engaged with an engaged portion 54 (see FIG. 4) provided on the bottom surface of the second toner accommodation portion 50 of the toner cartridge 1. In the present embodiment, the engaged portion 54 is a recessed portion that is recessed from the bottom surface (outer surface) of the second toner accommodation portion 50 extending in the attaching direction X1. The regulation member 8 is configured to be movable between a first position, at which the regulation member 8 is engaged with the engaged portion 54 of the toner cartridge 1 so that the toner cartridge 1 located at a predetermined position is not moved in the detaching direction X2, and a second position, at which the regulation member 8 allows the toner cartridge 1 to be moved in the detaching direction X2. The direction of movement of the regulation member 8 is a Y direction that is orthogonal to (intersects) the attaching direction X1. In the present embodiment, an unlocking cam 10 is a cam that is controlled by a camshaft 11 that is rotated upon receiving a drive force from a drive source (motor) (not illustrated) and that moves the regulation member 8 to the second position against the biasing force of the regulation spring 9 when canceling regulation on movement of the toner cartridge 1. A regulation member sensor 12 (second detection member, second detection portion) is an optical sensor that can detect which of the first position and second position the regulation member 8 is located at. Specifically, the regulation member sensor 12 includes a light emitting element and a light receiving element, and generates a detection signal that matches the amount of light emitted from the light emitting element to the light receiving element and received by the light receiving element.

A toner conveyance unit 13 conveys the toner in the toner cartridge 1 to the first toner accommodation portions 104Y, 104M, 104C, and 104B illustrated in FIG. 1 by way of a toner conveyance pipe 15 illustrated in FIGS. 3A and 3B. The toner accommodated in the second toner accommodation portion 50 of the toner cartridge 1 is discharged from a toner discharge port 55 to the outside of the toner cartridge 1, and thereafter conveyed into the toner conveyance unit 13 through a toner replenishment port 14. In the toner conveyance unit 13, the toner is conveyed to the first toner accommodation portions 104Y, 104M, 104C, and 104B by way of the toner conveyance pipe 15 by a toner conveyance screw 16.

A replenishment port shutter 17 closes the toner replenishment port 14 when the toner cartridge 1 is not attached to the apparatus main body 100 in order to prevent intrusion of foreign matter from the toner replenishment port 14. The replenishment port shutter 17 is provided so as to be movable between a closed position at which the replenishment port shutter 17 closes the toner replenishment port 14 and an open position at which the replenishment port shutter 17 opens the toner replenishment port 14, and biased from the open position toward the closed position by a shutter spring 18. When the toner cartridge 1 is attached to the attachment portion 300 of the apparatus main body 100, the replenishment port shutter 17 is pressed by the back surface 1a of the toner cartridge 1 to be moved to the open position indicated in FIG. 3B. The replenishment port shutter 17 also has a function of moving the toner cartridge 1 in the detaching direction X2 by receiving a force of the shutter spring 18 when the regulation member 8 is released to take out the toner cartridge 1 attached in the apparatus main body 100.

Toner Cartridge Attached State Detection Mechanism

FIGS. 5A to 5C are each a sectional view illustrating a mechanism that detects the attached state of the toner cartridge 1. FIG. 6 is a schematic view illustrating the position of the regulation member 8 with respect to the regulation member sensor 12.

FIGS. 5A and 6A illustrate a state (completely attached state) in which the toner cartridge 1 is attached at a predetermined position in the attachment portion 300 of the apparatus main body 100. When the toner cartridge 1 is at the predetermined position, communication between the apparatus main body 100 and the memory 53 of the toner cartridge 1 is enabled with an electric contact (cartridge electric contact) of the memory 53 contacting an electric contact (body electric contact) of the memory reading unit 7 of the apparatus main body 100. In this state, the regulation member 8 is located at the first position at which the regulation member 8 matches the engaged portion 54 in a position in the attaching/detaching direction to be engaged, and a light shield portion 8a of the regulation member 8 is located at a position at which the light shield portion 8a does not obstruct a region (optical axis L) through which light emitted from the light emitting element toward the light receiving element of the regulation member sensor 12 passes.

FIGS. 5B and 6B illustrate a state (incomplete attached state) in which the toner cartridge 1 has not reached the predetermined position although the door 2 is located at the closed position and the toner cartridge 1 is attached to the attachment portion 300 of the apparatus main body 100. Put differently, the state in which the toner cartridge 1 has not reached the predetermined position is a state in which the toner cartridge 1 is located at a position (position that is different from the predetermined position) shifted to the upstream side in the attaching direction X1 with respect to the predetermined position. In the configuration according to the present embodiment, when the toner cartridge 1 is in the incomplete attached state, the toner cartridge 1 is located at a position at which the toner cartridge 1 is pushed by the biasing force of the shutter spring 18 and is in abutment with the door 2. When the toner cartridge 1 is in the incomplete attached state, communication between the apparatus main body 100 and the memory 53 of the toner cartridge 1 is not enabled with the electric contact of the memory 53 not contacting the electric contact of the memory reading unit 7 of the apparatus main body 100. When the toner cartridge 1 is in the incomplete attached state, in addition, the engaged portion 54 of the toner cartridge 1 is not engaged with the regulation member 8. The regulation member 8 is located at the second position at which the regulation member 8 has been pressed downward by the bottom surface of the second toner accommodation portion 50 of the toner cartridge 1. When the regulation member 8 is at the second position, the light shield portion 8a of the regulation member obstructs the optical axis L of the regulation member sensor 12.

FIGS. 5C and 6C illustrate a state (unattached state) in which the toner cartridge 1 is not attached in the apparatus main body 100. At this time, no memory 53 of the toner cartridge 1 is present that contacts the memory reading unit 7 of the apparatus main body 100, and therefore communication between the apparatus main body 100 and the toner cartridge 1 has been disabled. In addition, the regulation member 8 is located at the first position. When the regulation member 8 is at the first position, the light shield portion 8a of the regulation member 8 does not obstruct the optical axis L of the regulation member sensor 12.

As described above, the three states as to how the toner cartridge 1 is attached to the attachment portion 300 of the apparatus main body 100, that is, the completely attached state, the incomplete attached state, and the unattached state, can be determined on the basis of a combination of information based on the two states of the memory reading unit 7, that is, "able to communicate" and "unable to communicate", and information based on the two states of the regulation member sensor 12, that is, "obstructing the optical axis" and "not obstructing the optical axis".

Figure 12:
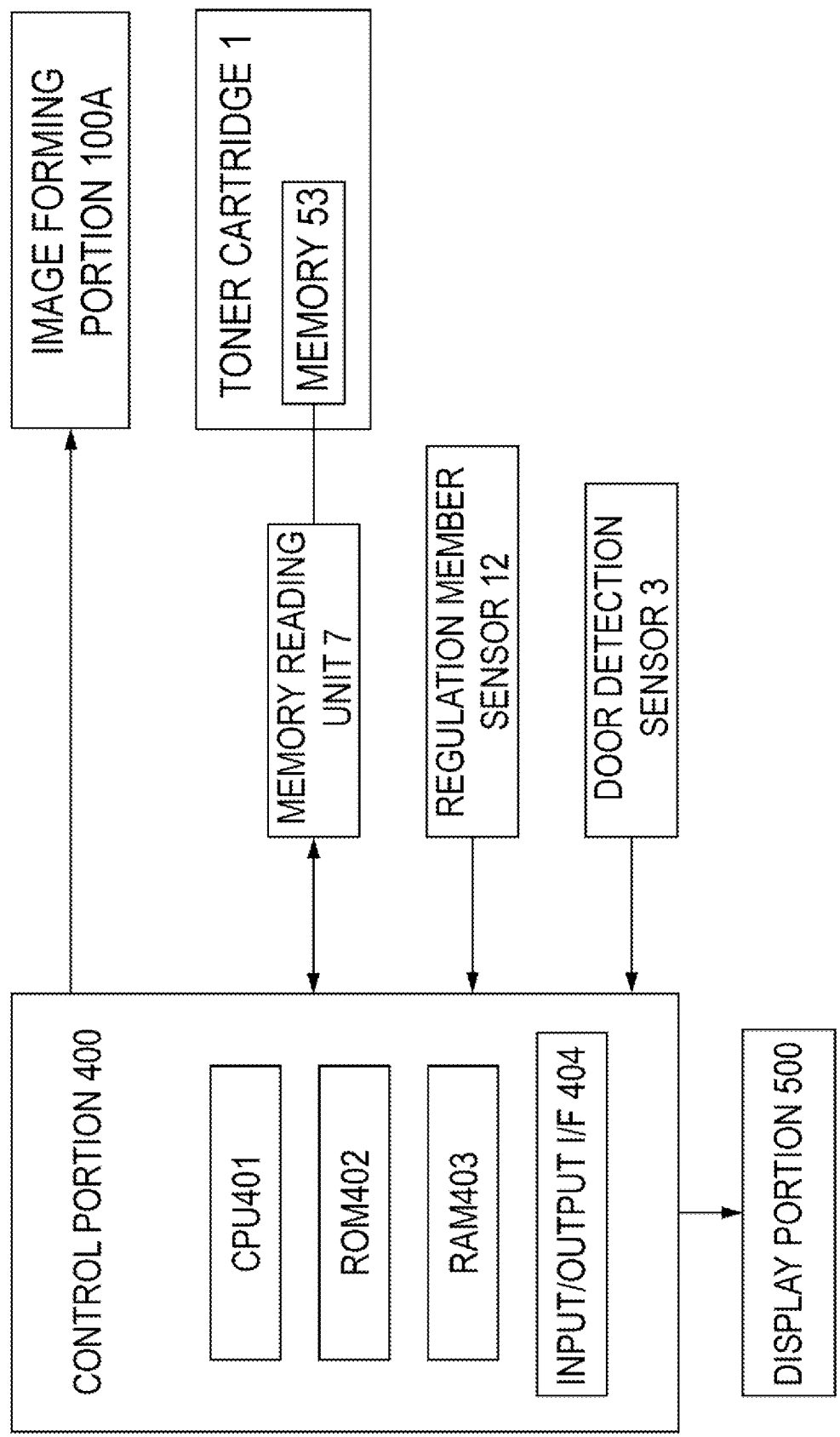
FIG. 12 is a control block diagram according to the first embodiment.

FIG. 12 is a control block diagram of an image forming apparatus 1000 according to the present embodiment. A control portion 400 includes a central processing unit (CPU) 401 as a main element that performs computation, memories such as a read only memory (ROM) 402 and a random access memory (RAM) 403 as storage units, an input/output interface (I/F) 404 that allows input and output of information from and to peripheral devices, etc. The CPU 401 is also called a "processor". The CPU 401 is not limited to a single processor, and may be constituted as multiple processors. The CPU 401 performs various types of control for the control portion 400 using the ROM 402 and the RAM 403. The RAM 403 stores the result of detection by the sensors, the result of computation, etc. The ROM 402 is a non-volatile rewritable storage unit, and stores a control program, a data table obtained in advance, various variables, etc.

The control portion 400 is a control unit that integrally controls operation of the image forming apparatus 1000. Targets to be controlled in the image forming apparatus 1000 are connected to the control portion 400 via the input/output OF 404. The control portion 400 controls the image forming process discussed above and performed by the image forming portion 100A. In addition, the control portion 400 determines the three states of the toner cartridge 1 discussed above by detecting whether the door 2 is open or closed using the door detection sensor 3, whether or not the memory reading unit 7 can communicate with the memory 53 of the toner cartridge 1, and the state of regulation using the regulation member sensor 12.

FIG. 7 is a flowchart illustrating the flow for the control portion 400 in the apparatus main body 100 to determine the three states of the toner cartridge 1 on the basis of information obtained from the memory reading unit 7 and the regulation member sensor 12. The apparatus main body 100 starts the determination flow in FIG. 7 upon detecting that the door 2 has been closed (S101).

As illustrated in FIG. 2, the apparatus main body 100 includes a display portion 500 (display, display portion) as an informing portion. When the door detection sensor 3 has detected that the door 2 is located at the closed position, and when the memory reading unit 7 is not able to communicate (S102: No) and the regulation member sensor 12 has detected that the regulation member 8 is located at the first position (not obstructing the optical axis) (S104: No), the display portion 500 indicates first information. When the door detection sensor (door sensor) 3 has detected that the door 2 is located at the closed position, and when the memory reading unit 7 is not able to communicate (S102: No) and the regulation member sensor 12 has detected that the regulation member 8 is located at the second position (obstructing the optical axis) (S104: Yes), meanwhile, the display portion 500 indicates second information that is different from the first information.

The first information is a message, a symbol, or a picture that says "A cartridge (unit) is not attached to the apparatus main body" or "Attach a cartridge (unit) to the apparatus main body". The second information is a message, a symbol, or a picture that says "Check the attached state of the cartridge (unit)" or "Reattach the cartridge (unit) to the apparatus main body".

When the door detection sensor 3 has detected that the door 2 is located at the closed position, and when the memory reading unit 7 is able to communicate (S102: Yes) and the regulation member sensor 12 has detected that the regulation member 8 is located at the first position (not obstructing the optical axis) (S103: No), drive of the image forming portion such as the photosensitive drums 101 is started.

When the door detection sensor 3 has detected that the door 2 is located at the closed position, and when the memory reading unit 7 is able to communicate (S102: Yes) and the regulation member sensor 12 has detected that the regulation member 8 is located at the second position (obstructing the optical axis) (S103: Yes), meanwhile, it is considered to be highly likely that any trouble such as a sensor failure has occurred. In this case, the display portion 500 indicates the presence of a possible failure.

As described above, it is possible to determine, using the memory reading unit 7 and the regulation member sensor 12, which of the completely attached state, the incomplete attached state, and the unattached state the toner cartridge 1 attached to the attachment portion 300 of the apparatus main body 100 is in. In addition, the display portion 500 can inform a user of appropriate information about the attached state of the toner cartridge 1.

Second Embodiment

An image forming apparatus according to a second embodiment of the present invention will be described below. Constituent elements of the second embodiment that are the same as those of the first embodiment will not be described, and components of the second embodiment that are different from those of the first embodiment such as a switch 19 and components around the regulation member sensor 12 will be described.

Figure 8A:
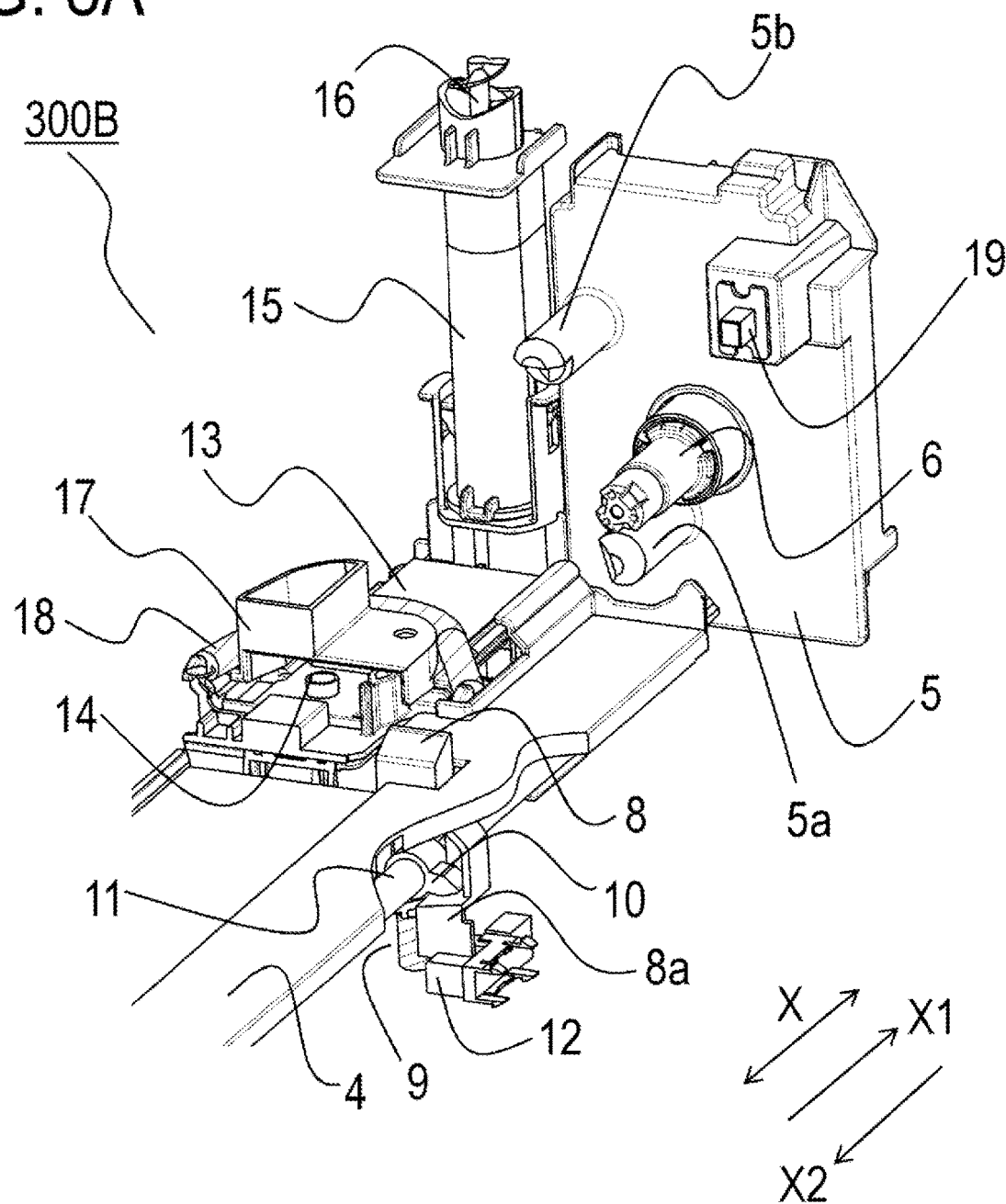
FIG. 8A is a perspective view illustrating an overview of a toner cartridge accommodation portion in an image forming apparatus according to a second embodiment.

FIGS. 8A and 8B are each a perspective view of a attachment portion 300B of the apparatus main body 100 for attaching the toner cartridge 1. FIG. 8A is a perspective view illustrating the unattached state in which the toner cartridge 1 is not attached to the attachment portion 300B of the apparatus main body 100. FIG. 8B is a perspective view illustrating the completely attached state in which the toner cartridge 1 is completely attached to the attachment portion 300B of the apparatus main body 100.

The switch 19 is a sensor that detects whether or not the toner cartridge 1 is located at a predetermined position in the apparatus main body 100. The switch 19 is a push-type sensor that outputs an on signal when a switch lever is depressed by a predetermined amount and that is turned off when the amount by which the switch lever is depressed is less than the predetermined amount. The switch 19 is disposed so as to be depressed by the predetermined amount by abutting against the back surface 1a of the second toner accommodation portion 50 of the toner cartridge 1 when the toner cartridge 1 is located at the predetermined position. This makes it possible to detect whether or not the toner cartridge 1 is located at the predetermined position in the apparatus main body 100.

The switch 19 is not limited to a push-type sensor, and may be an optical sensor that detects the position of the toner cartridge 1 on the basis of the optical axis L being obstructed when the toner cartridge 1 is attached in the apparatus main body 100, for example.

Toner Cartridge Attached State Detection Mechanism

FIGS. 9A, 9B, and 9C are each a sectional view illustrating a mechanism that detects the attached state of the toner cartridge 1 according to the present embodiment. FIGS. 10A, 10B, and 10C are each a detailed view specifically illustrating the relationship between the regulation member sensor 12 and the light shield portion 8a of the regulation member 8 as seen from the right side in FIGS. 9A, 9B, and 9C.

FIGS. 9A and 10A are each a sectional view illustrating the completely attached state in which the toner cartridge 1 is completely attached to the attachment portion 300B of the apparatus main body 100. At this time, the switch 19 has been turned on, and the light shield portion 8a of the regulation member 8 obstructs the optical axis L of the regulation member sensor 12.

FIGS. 9B and 10B are each a sectional view illustrating the incomplete attached state in which the toner cartridge 1 is not completely attached to the attachment portion 300B of the apparatus main body 100. At this time, the switch 19 has been turned off, and the light shield portion 8a of the regulation member 8 obstructs the optical axis L of the regulation member sensor 12 with the regulation member 8 pressed downward by the bottom surface of the second toner accommodation portion 50.

FIGS. 9C and 10C are each a sectional view illustrating the unattached state in which the toner cartridge 1 is not attached to the attachment portion 300B of the apparatus main body 100. At this time, the switch 19 has been turned off, and the light shield portion 8a of the regulation member 8 does not obstruct the optical axis L of the regulation member sensor 12.

As described above, the three states as to how the toner cartridge 1 is attached to the attachment portion 300B of the apparatus main body 100, that is, the completely attached state, the incomplete attached state, and the unattached state, can be determined on the basis of a combination of information based on the two states of the switch 19, that is, "on" and "off", and information based on the two states of the regulation member sensor 12, that is, "obstructing the optical axis" and "not obstructing the optical axis".

Figure 13:
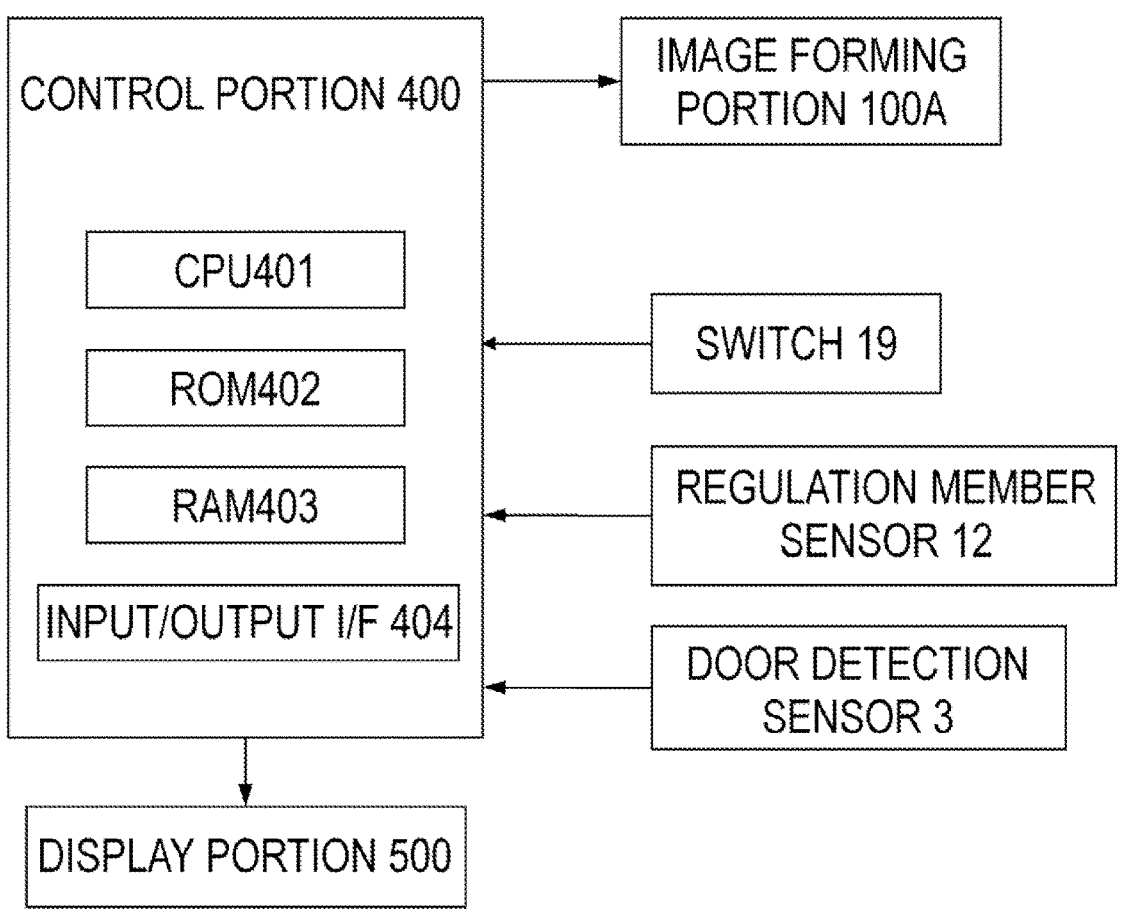
FIG. 13 is a control block diagram according to the second embodiment.

FIG. 13 is a control block diagram of an image forming apparatus 1000 according to the present embodiment. The control portion 400 determines the three states of the toner cartridge 1 discussed above by detecting whether the door 2 is open or closed using the door detection sensor 3, whether or not the toner cartridge 1 is attached using the switch 19, and the state of regulation using the regulation member sensor 12.

FIG. 11 is a flowchart illustrating the flow for the control portion 400 in the apparatus main body 100 to determine the attached state of the toner cartridge 1 on the basis of information obtained from the switch 19 and the regulation member sensor 12. The apparatus main body 100 starts the determination flow in FIG. 11 upon detecting that the door 2 has been closed (S201).

When the door detection sensor 3 has detected that the door 2 is located at the closed position, and when the regulation member sensor 12 has detected that the regulation member 8 is located at the first position (not obstructing the optical axis) (S202: No) and the switch 19 has detected that the switch lever is not depressed by the predetermined amount by the toner cartridge 1 (S204: No), the display portion 500 indicates first information.

The first information is a message, a symbol, or a picture that says "A cartridge (unit) is not attached to the apparatus main body" or "Attach a cartridge (unit) to the apparatus main body".

When the door detection sensor 3 has detected that the door 2 is located at the closed position, and when the regulation member sensor 12 has detected that the regulation member 8 is located at the first position (not obstructing the optical axis) (S202: No) and the switch 19 has detected that the switch lever is depressed by the predetermined amount by the toner cartridge 1 (S204: Yes), it is considered to be highly likely that any trouble such as a sensor failure has occurred. In this case, the display portion 500 indicates the presence of a possible failure.

When the door detection sensor 3 has detected that the door 2 is located at the closed position, and when the regulation member sensor 12 has detected that the regulation member 8 is located at the second position (obstructing the optical axis) (S202: Yes) and the switch 19 has detected that the switch lever is not depressed by the predetermined amount by the toner cartridge 1 (S203: No), the display portion 500 indicates second information.

The second information is a message, a symbol, or a picture that says "Check the attached state of the cartridge (unit)" or "Reattach the cartridge (unit) to the apparatus main body".

When the door detection sensor 3 has detected that the door 2 is located at the closed position, and when the regulation member sensor 12 has detected that the regulation member 8 is located at the second position (obstructing the optical axis) (S202: Yes) and the switch 19 has detected that the switch lever is depressed by the predetermined amount by the toner cartridge 1 (S203: Yes), meanwhile, drive of the image forming portion such as the photosensitive drums 101 is started.

As described above, it is possible to determine, using the switch 19 and the regulation member sensor 12, which of the completely attached state, the incomplete attached state, and the unattached state the toner cartridge 1 attached to the attachment portion 300B of the apparatus main body 100 is in. In addition, the display portion 500 can inform a user of appropriate information about the attached state of the toner cartridge 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091723, filed on Jun. 6, 2022, which is hereby incorporated by reference herein in its entirety.

What is claimed is:

1. An image forming apparatus comprising:
an apparatus main body; and
a unit detachably attachable to the apparatus main body in an attaching/detaching direction and including an engaged portion and a memory,
wherein the apparatus main body includes:
  a memory reading portion capable of reading information through communication with the memory in a case where the unit is located at a predetermined position in the apparatus main body,
  a regulation member configured to be movable between a first position and a second position, the regulation member regulating movement of the unit in a detaching direction from the predetermined position by engaging with the engaged portion of the unit in a case where the regulation member is located at the first position, and allowing movement of the unit in the detaching direction from the predetermined position in a case where the regulation member is located at the second position,
  a biasing member that biases the regulation member in a direction of moving the regulation member from the second position toward the first position,
  a detection portion that detects which of the first position and the second position the regulation member is located at,
  a control portion, and
  an informing portion;
wherein the regulation member is configured
  to be located at the first position by a biasing force of the biasing member in a case where the unit is located at the predetermined position or in a case where the unit is not attached to the apparatus main body, and
  to be located at the second position in a case where the unit is located at a position that is different from the predetermined position in the attaching/detaching direction; and
wherein the control portion is configured to:
  cause the informing portion to indicate first information in a case where the memory reading portion is not able to communicate with the memory of the unit and the detection portion has detected that the regulation member is located at the first position, and
  cause the informing portion to indicate second information that is different from the first information in a case where the memory reading portion is not able to communicate with the memory of the unit and the detection portion has detected that the regulation member is located at the second position.

2. The image forming apparatus according to claim 1, wherein the first information is information that indicates an unattached state in which the unit is not attached to the apparatus main body, and the second information is information that indicates an incomplete attached state in which the unit is attached to the apparatus main body in an incomplete state.

3. The image forming apparatus according to claim 1, wherein the first information is information that indicates an unattached state in which the unit is not attached to the apparatus main body, and the second information is information that prompts one to check whether the unit is attached to the apparatus main body or information that prompts one to reattach the unit to the apparatus main body.

4. The image forming apparatus according to claim 1,
wherein the engaged portion is a recessed portion that is recessed from an outer surface of the unit that extends in the attaching/detaching direction,
wherein the regulation member is configured to be movable between the first position and the second position in a direction that is orthogonal to the attaching/detaching direction, and
wherein the regulation member and the recessed portion coincide with each other in position in the attaching/detaching direction in a case where the unit is located at the predetermined position, and the regulation member and the recessed portion do not coincide with each other in position in the attaching/detaching direction in a case where the unit is located at a position off the predetermined position.

5. The image forming apparatus according to claim 1,
wherein the control portion starts operation of an image forming portion in a case where the memory reading portion is able to communicate with the memory of the unit and the detection portion has detected that the regulation member is located at the first position.

6. The image forming apparatus according to claim 1,
wherein the unit is a cartridge that includes a toner accommodation portion that accommodates a toner.

7. The image forming apparatus according to claim 1,
wherein the apparatus main body includes
an opening portion through which the unit passes in a case where the unit is attached to and detached from the apparatus main body,
a door that opens and closes the opening portion, and
a door sensor that detects whether the door is open or closed; and
wherein the control portion causes the informing portion to indicate the first information or the second information in a case where the door sensor detects that the door has been closed.

* * * * *